(12) United States Patent
Boyle et al.

(10) Patent No.: US 11,662,574 B2
(45) Date of Patent: May 30, 2023

(54) DETERMINING GAZE DEPTH USING EYE TRACKING FUNCTIONS

(71) Applicant: Zinn Labs, Inc., Palo Alto, CA (US)

(72) Inventors: Kevin Boyle, Palo Alto, CA (US); Robert Konrad, Palo Alto, CA (US); Nitish Padmanaban, Menlo Park, CA (US); Gordon Wetzstein, Palo Alto, CA (US)

(73) Assignee: Zinn Labs, Inc., Palo Alto, CA (US)

( * ) Notice: Subject to any disclaimer, the term of this patent is extended or adjusted under 35 U.S.C. 154(b) by 0 days.

(21) Appl. No.: 17/522,211

(22) Filed: Nov. 9, 2021

(65) Prior Publication Data

US 2022/0146819 A1     May 12, 2022

Related U.S. Application Data

(60) Provisional application No. 63/111,822, filed on Nov. 10, 2020.

(51) Int. Cl.
   *G02B 27/00*          (2006.01)
   *G02B 27/01*          (2006.01)
   *G06F 3/01*           (2006.01)

(52) U.S. Cl.
   CPC ..... *G02B 27/0075* (2013.01); *G02B 27/0172* (2013.01); *G02B 27/0176* (2013.01); *G06F 3/013* (2013.01); *G02B 2027/0174* (2013.01); *G02B 2027/0178* (2013.01)

(58) Field of Classification Search
   CPC ............ G02B 27/0075; G02B 27/0172; G02B 27/0176; G02B 27/0093; G02B 2027/0174; G02B 2027/0178; G02B 2027/0127; G02B 2027/0187; G06F 3/013; G06V 40/18
See application file for complete search history.

(56) References Cited

U.S. PATENT DOCUMENTS

| | | | |
|---|---|---|---|
| 9,135,508 B2 | 9/2015 | Vaught et al. | |
| 10,718,942 B2 * | 7/2020 | Ortiz Egea | ........ G02B 27/0179 |
| 10,996,746 B2 * | 5/2021 | Ortiz Egea | ............. G06F 3/013 |
| 2013/0154918 A1 * | 6/2013 | Vaught | ..................... G06F 3/013 |
| | | | 382/103 |

(Continued)

OTHER PUBLICATIONS

Cognolato, M. et al. "Head-Mounted Eye Gaze Tracking Devices: An Overview of Modern Devices and Recent Advances." Journal of Rehabilitation and Assistive Technologies Engineering, vol. 5, Jun. 2018, pp. 1-13.

(Continued)

*Primary Examiner* — Lin Ye
*Assistant Examiner* — John H Morehead, III
(74) *Attorney, Agent, or Firm* — Fenwick & West LLP

(57) ABSTRACT

A device includes a camera assembly and a controller. The camera assembly is configured to capture images of both eyes of a user. Using the captured images, the controller determines a location for each pupil of each eye of the user. The determined pupil locations and captured images are used to determine eye tracking parameters which are used to compute values of eye tracking functions. With the computed values and a model that maps the eye tracking functions to gaze depths, a gaze depth of the user is determined. An action is performed based on the determined gaze depth.

20 Claims, 10 Drawing Sheets

(56) References Cited

U.S. PATENT DOCUMENTS

| | | | |
|---|---|---|---|
| 2013/0241805 A1* | 9/2013 | Gomez | G06F 3/013 |
| | | | 345/8 |
| 2015/0302251 A1 | 10/2015 | Smith et al. | |
| 2016/0026253 A1 | 1/2016 | Bradski et al. | |
| 2016/0370605 A1* | 12/2016 | Ain-Kedem | G06V 40/19 |
| 2017/0123233 A1 | 5/2017 | Sabovic et al. | |
| 2017/0235360 A1 | 8/2017 | George-Svahn | |
| 2021/0011549 A1* | 1/2021 | Ryan | G02B 27/0172 |
| 2021/0089121 A1* | 3/2021 | Rönngren | G02B 27/0093 |
| 2021/0378509 A1 | 12/2021 | Nistico | |

OTHER PUBLICATIONS

PCT International Search Report and Written Opinion, PCT Application No. PCT/US2021/058653, dated Feb. 15, 2022, 12 pages.

* cited by examiner

Configuration
800

TOP VIEW

INSIDE VIEW

Configuration
1000

DETERMINING GAZE DEPTH USING EYE TRACKING FUNCTIONS

CROSS-REFERENCE TO RELATED APPLICATIONS

This application claims the benefit of U.S. Provisional Application No. 63/111,822, filed Nov. 10, 2020, which is incorporated by reference in its entirety.

FIELD OF THE INVENTION

This disclosure relates generally to eye tracking, and more specifically to determining gaze depth using eye tracking functions.

BACKGROUND

There are many ways that gaze depth may be determined conventionally. For example, the eye may be illuminated with multiple point sources to produce glints, and the position of the glints may be used to determine eye position. Once an orientation for each eye is known, conventional systems then estimate a gaze vector for each eye and estimate gaze depth based on where the gaze vectors intersect.

SUMMARY

Embodiments for determining gaze depth is described herein. The gaze depth represents a distance from a user at which their eyes are focused. Using images captured of the eyes of a user, eye tracking parameters can be determined that represent the position of the pupils of the user's eyes. The eye tracking parameters are input into eye tracking functions. Values of the eye tracking function may be input into a model that maps various values of eye tracking functions and/or the eye tracking parameters to corresponding gaze depths. And in some embodiments, the model may also map the various values of eye tracking functions and/or the eye tracking parameters to corresponding optical powers (e.g., that may be used to adjust varifocal lenses on a headset).

In some embodiments, a device is described that includes a camera assembly. The camera assembly is configured to capture images of both eyes of a user. The controller is configured to determine a location for each pupil of each eye of the user using the captured images. The controller is configured to determine values of eye tracking parameters using the images and the determined locations for each pupil. The controller is configured to compute values of eye tracking functions using the eye tracking parameters. The controller is configured to determine a gaze depth of the user using the computed values and a model that maps values of the eye tracking functions to various gaze depths. The controller is configured to perform an action based on the determined gaze depth.

In some embodiments a method is described. The method includes determining a location for each pupil of each eye of a user using one or more captured images. Values of eye tracking parameters are determined using the captured images and the determined locations for each pupil. Values of eye tracking functions are computed using the values of the eye tracking parameters. A gaze depth of the user is determined using the computed values and a model that maps values of the eye tracking functions to various gaze depths. An action is performed based on the determined gaze depth.

In some embodiments a non-transitory computer readable medium is described. The non-transitory computer readable medium is configured to store program code instructions. When the instructions are executed by a processor of a device, the instructions cause the device to perform steps that include determining a location for each pupil of each eye of a user using one or more captured images. Values of eye tracking parameters are determined using the captured images and the determined locations for each pupil. Values of eye tracking functions are computed using the values of the eye tracking parameters. A gaze depth of the user is determined using the computed values and a model that maps values of the eye tracking functions to various gaze depths. An action is performed based on the determined gaze depth.

Figure 1:
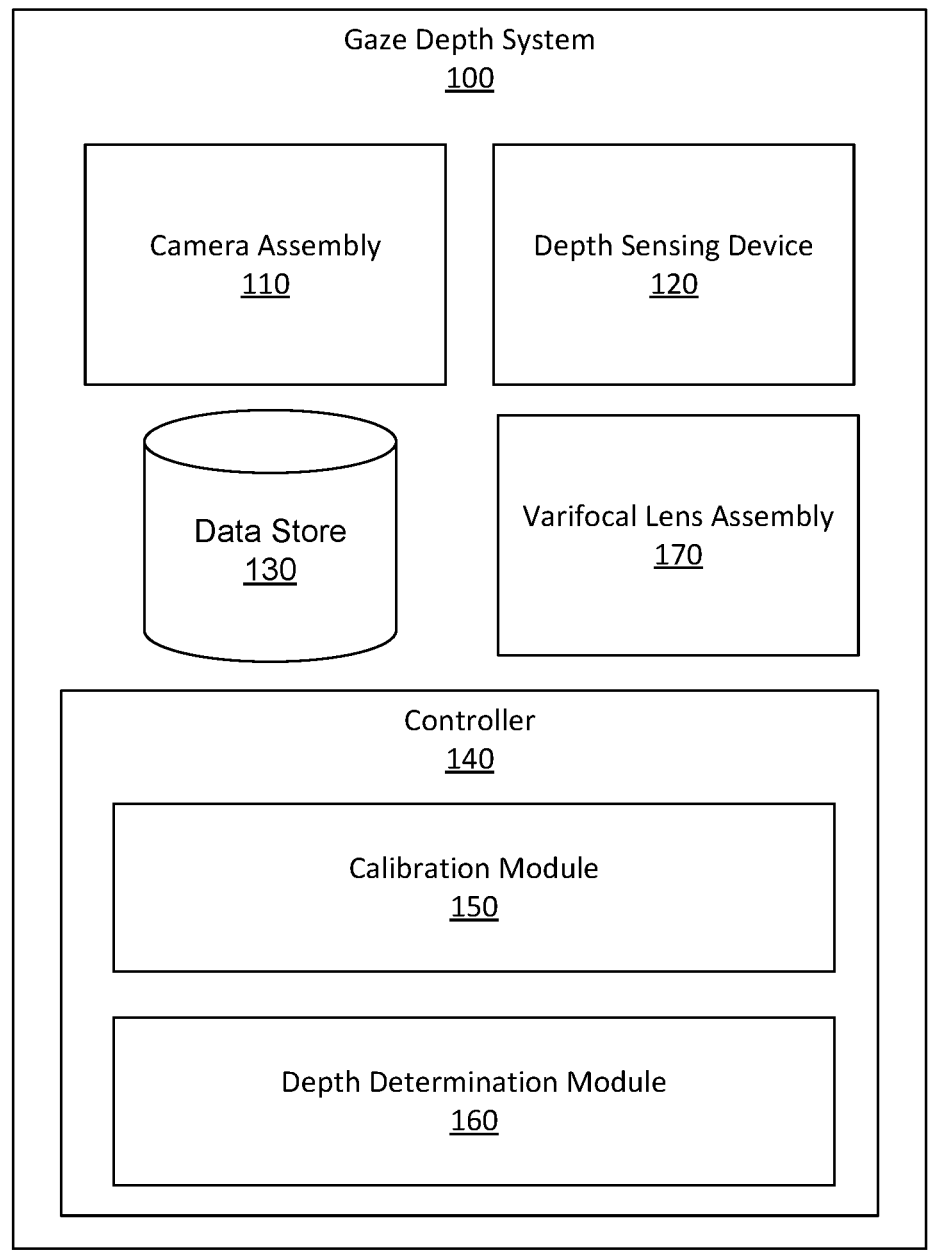
FIG. 1 is a block diagram of the varifocal system in accordance with one or more embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments are described for determining gaze depth using eye tracking functions. A gaze depth system is configured to determine gaze depth of a user. The gaze depth system may include a camera assembly (e.g., eye facing cameras) and a controller. In some embodiments, the gaze depth system may additionally include one or more illuminators that illuminate one or both eyes, one or more outward facing depth camera assemblies (DCAs), a varifocal lens assembly (that includes one or more varifocal lenses), or some combination thereof. The camera assembly is configured to capture images of both eyes of a user. The controller is configured to determine a location for each pupil of each eye of the user using the captured images. The controller is configured to determine values of eye tracking parameters (e.g., distance from inner canthus to outer canthus or the edge of the upper eyelid) using the images and the determined locations for each pupil. Eye tracking parameters are parameters that can be used to reference a location of a pupil using other features of the eye. For example, the area or shape of the inner sclera (the white of the eye between the inner canthus and iris) may be calculated to interpret the direction the user is looking. The controller is configured to compute values of eye tracking functions using the eye tracking parameters. Eye tracking functions are functions whose values vary as a function of eye orientation and/or gaze depth. Each eye tracking function is a function of one or more of the eye tracking parameters. The controller is configured to determine a gaze depth of the user using the computed values and a model that maps the computed values of the eye tracking functions to various gaze depths. The controller may be configured to determine a gaze depth of the user using the computed values of the eye tracking functions and a model that maps values of the eye tracking functions to corresponding gaze depths and/or optical powers (e.g., that may be used to adjust optical powers of one or more varifocal lenses).

Accommodation is the ability of a user's eyes to focus at a range of gaze depths. The range of accommodation for eyes range may differ from user to user. For example, a teenager will generally have a much larger range of accommodation than a 50 year old due to presbyopia. However, even people whose eyes have a limited range of accommodation still generally have some ability to accommodate (also referred to as "residual accommodation"). In some embodiments, the gaze depth system may determine a residual accommodation for one or both eyes of the user. The gaze depth system may use the determined residual accommodation to lesson amounts of optical power to be applied by the varifocal assembly. This may, e.g., lessen design requirements for the varifocal assembly (e.g., may not need as large of focal range), and by extension, in some instances may decrease response time of the varifocal assembly (e.g., takes less time to transition between 0 and 2.5 D, than 0 and 3 D). Correct compensation for the residual accommodation may also be needed to optimize user comfort.

FIG. 1 is a block diagram of the gaze depth system 100 in accordance with one or more embodiments. Note that while FIG. 1 illustrates some of the components of the gaze depth system; there may be more or fewer components in the gaze depth system than shown. The gaze depth system 100 includes a camera assembly 110, data store 130, and controller 140. In some embodiments, the gaze depth system may also include a depth sensing device 120 and/or a varifocal lens assembly 170.

The camera assembly 110 is configured to capture images of the one or more eyes of a user. The camera assembly may include one or more imaging devices (i.e., cameras). In order to determine a gaze depth of a user, the positions of both pupils of the user's eyes are needed. As such, the gaze depth system 100 may include two imaging devices, one to capture images of each pupil, or a single imaging device configured to capture images of both pupils. The imaging device is a camera that captures light in the visible, UV, or IR spectra. Each imaging device has a field of view that defines an area of the user's face that the imaging device can capture images of. The fields of view of one or more cameras are such that the captured images span the entirety of the eyes of the user. For example, the captured image(s) of an eye should span at least the distance between the inner canthus and outer canthus the eye of the user and have the pupil visible in the FOV for all positions of the eye (when open). The camera assembly 110, in some embodiments, is configured to be always on and capture images of the eyes of the user continuously. However, in embodiments where power savings and extended battery life is valued, the camera assembly 110 is configured to capture an image of the eye of the user with a periodic frequency set by the gaze depth system 100.

In some embodiments, the gaze depth system 100 may include one or more illuminators (not shown) that illuminate one or both eyes of the user. The illumination may facilitate imaging one or both eyes by the camera assembly 110. The one or more illuminators illuminate one or both eyes in accordance with instructions from the controller 140. An illuminator illuminates an eye with infrared light (e.g., 850-950 nm). An illuminator may be, e.g., a light emitting diode, or some other light source that emits in the infrared. In some embodiments, the one or more illuminators can provide pulsed and/or continuous illumination of the eyes. In some embodiments, the emitted light is flood illumination. In other embodiments, the emitted light is in an illumination pattern (e.g., structured light, glints, etc.). In some embodiments, an illuminator is a co-aligned illuminator that emits light that is aligned with the optical path of the camera assembly 110 (i.e., on-axis illumination). There may also be an off-axis illuminator that illuminates the eye from a position that is not co-aligned with the eye (i.e., off-axis illumination). The illuminator may emit light in the near-infrared spectrum. The light from the illuminator aids the camera assembly 110 by creating light that reflects off the eye even when there is little ambient light.

The depth sensing device 120 determines depth information for a portion of a local area surrounding the gaze depth system 100. The depth sensing device 120, in some embodiments may be referred to as a depth camera assembly (DCA). The depth sensing device 120 includes one or more outward facing imaging devices and may also include an outward facing illuminator. In some embodiments, the outward facing illuminator illuminates a portion of the local area with light. The light may be, e.g., structured light (e.g., dot pattern, bars, etc.) in the infrared (IR), IR flash for time-of-flight, etc. In some embodiments, the one or more outward facing imaging devices capture images of the portion of the local area that include the light from the outward facing illuminator. The depth sensing device 120 computes depth information for the portion of the local area using the captured images and one or more depth determination techniques. The depth determination technique may be, e.g., time-of-flight (ToF) depth sensing, structured light, passive stereo analysis, active stereo analysis (uses texture added to the scene by light from the illuminator), some other technique to determine depth of a scene, or some combination thereof.

The data store 130 stores data created and received by the gaze depth system 100. For example, the data store 130 may store a user profile for each user of the gaze depth system, the user profile including eye tracking parameters associated with the user or user preferences. The data store is additionally configured to store data such as a residual accommodation of the user, images of eye of the user (e.g., those captured by the camera assembly 110 or some other device), data about the local area from the depth sensing device 120, values of eye tracking parameters, values of eye tracking functions, residual accommodation values for the eyes of the user, user profile information, accommodation applications, previous calibrations, illuminator specifications, depth sensing device specifications, camera assembly setting, etc.

The controller 140 controls components of the gaze depth system 100. The controller receives captured images from the camera assembly 110 to estimate a gaze depth of the eyes of the user. The controller 140 may estimate the gaze depth by calculating a horizontal gaze angle from the captured image. In other embodiments, the vertical gaze angle is calculated by the controller 140. The controller 140 includes a depth determination module 160 and a calibration module 150.

The depth determination module 160 is configured to determine a location for each pupil of each eye of the user using the captured images. The depth determine module 160 may use image processing to determine a location of the pupils of the user in the captured images. The depth determination module 160 may, e.g., use an event camera, laser scanning or beam steering, machine learning, object recognition, ellipse fitting algorithm, some other algorithm for detecting pupils in the captured images, or some combination thereof.

The depth determination module 160 is configured to determine values of eye tracking parameters using the captured images and the determined locations for each pupil. In some embodiments, the depth determination module 160 maps a horizontal axis on the captured images of each eye. A horizontal axis is bounded by two end points. The length of the horizontal axis is one eye tracking parameter. The end points, for a given image of an eye, may correspond with locations of the inner canthus and outer canthus of the eye, or be arbitrarily chosen points in the image frame. In the case of arbitrarily chosen points, a 3D eye model generated by glint tracking or other methods may be used to scale the baseline dimension in the case of frame slippage. For example, the depth determination module 160 may identify the locations of the inner canthus and outer canthus for each eye and define the horizontal axis of the left eye to be between the inner and outer canthus of the left eye, and the horizontal axis of the right eye to be between the inner and outer canthus of the right eye. In some embodiments, the depth determination module 160 may not use end points at all, and instead parameterize the horizontal line segment by its length, angle, and origin. The depth determination module 160 identifies a reference location (e.g., center of the pupil) on the pupil, and its associated position along the horizontal axis. The distance from an end point (e.g., inner canthus) to the associated position may be another eye tracking parameter. The calculation of the eye tracking parameters is described further with reference to FIG. 2. Note that the above discussion is in the context of a horizontal axis. In some embodiments, additionally or alternatively, the eye tracking parameters may be derived from a vertical axis that spans the eye.

The depth determination module 160 is configured to determine a gaze depth of the user using the computed values and a model that maps the computed values of the eye tracking functions to various gaze depths. The depth determination module 160 may input the computed values into the model. The model may output a corresponding gaze depth and/or optical power. The model is discussed in detail below with regard to FIG. 3.

The controller 140 may use the gaze depth and/or optical power to perform an action. The action performed using the gaze depth may be a communication to a system external to the gaze depth system 100. For example, based on the determined gaze depth, the gaze depth system 100 may transmit information to an associated augmented reality system. The transmitted information may, for example, indicate that the gaze depth of the user is associated with the user providing a command to the augmented reality system such as selecting a specific item by looking at it. Other external systems that the gaze depth system 100 may transmit or request information from based on the gaze depth may include, hearing aids, smart phones, medical devices, and some other device and/or application that uses gaze depth as an input, or some combination thereof. Communication with these external systems may provide, for example, drowsiness detection, reminders, digital health metrics, fall detection, behavioral analysis, etc. In other examples, the action performed may be done by a part of the gaze depth system 100. For example, system may be configured to model and monitor cognitive load based on the gaze depth of the user. The action in that embodiment is to calculate the user's cognitive load and make adjustments to the gaze depth system based on the cognitive load. The gaze depth system 100 can be configured to perform other actions based on the determined gaze depth.

In some embodiments, the action performed based on the gaze depth is dynamically adjusting an optical power of one or more varifocal lenses of a varifocal lens assembly 170 (also referred to as focus-tunable lenses). The varifocal lens assembly 170 includes one or more optical elements of variable focal length that operate alone or together such that the varifocal lens assembly 170 has a range of focal lengths. The range of focal lengths allows the varifocal lens assembly 170 to provide variable optical power. The range of optical power may include negative optical powers, zero optical power, positive optical powers, or some combination thereof. In some embodiments, the range of optical power is continuous (e.g., from 0-3 Diopters). In some embodiments, the range of optical power is discrete (e.g., 0 to 3 Diopters in increments of 0.1 Diopters). In some cases, the discrete ranges of optical power may be set to correspond to certain distances from the user (e.g., reading distance, computer distance, and more than 20 feet away). An optical element of variable focal length may be, e.g., Alvarez lens, a liquid lens, a liquid crystal lens, some other lens with a dynamically adjustable focal length, or some combination thereof. In some embodiments, the varifocal lens assembly 170 may also include one or more optical elements of fixed focal length and/or prisms.

The depth determination module 160 processes the data received from the camera assembly 110, and in some cases depth information from the depth sensing device 120, to determine an appropriate adjustment to the varifocal lens assembly 170. The depth determination module 160 may adjust a focal length of the varifocal lens assembly 170 based in part on the determined gaze depth. The depth determination module 160 selects the focal length for each varifocal assembly that corresponds to the determined gaze depth (i.e., the focal length at which optical power of the varifocal lens assembly and the optical power of the eye are such that objects at the determined gaze depth are in focus—in some cases it may be offset in part by a residual accommodation of the user). The controller instructs each of the varifocal assemblies to adjust their respective focal lengths to the corresponding selected focal length. In this manner, the gaze depth system 100 is able to dynamically adjust focus to different depths.

The depth determination module 160 may also determine a residual accommodation for one or both eyes of the user. The residual accommodation may be received from, e.g., a vision prescription that is input into the gaze depth system 100. The vision prescription may be, e.g., from an optometrist and reports a "near add." In some embodiments, with a smartphone where a DCA or other depth estimate from the user to the calibration target is available, the controller 140 may prompt (e.g., via an audio prompt, via audio and/or visual information on device, etc.) the user to physically move the target displayed on the device (e.g., mobile phone) to a comfortable viewing distance with different lens powers applied to the varifocal lens assembly 170. The controller 140 may prompt the user to repeat this procedure for each lens power as the user moves the target from near to far or in reverse, from far to near. The user's preferred viewing distances at different lens power settings can characterize their residual accommodation.

The gaze depth system 100 can, for a given eye, use the residual accommodation of the user for that eye to reduce the amount of optical power that is applied by the corresponding varifocal lens assembly. This may potentially increase the speed of accommodation of the varifocal lens assembly between extreme range values (as there is a smaller delta of optical power that the varifocal lens assembly traverses through). Likewise, the use of residual accommodation can decrease the range of focal lengths that each varifocal lens assembly 170 is designed to have available to it.

The calibration module 150 calibrates the model. The calibration module 150 may prompt the user to look at a target object and instruct the camera assembly 110 to capture images of the eyes of the user. The calibration module 150 determines a distance to the target object using depth information from the depth sensing device. The calibration module 150 determines a location for each pupil of each eye of the user using the captured images (taken while the user is looking at the target object). The calibration module 150 may determine the values of eye tracking parameters for each pupil. The calibration module 150 may compute the values of eye tracking functions using the values of the eye tracking parameters. Note in some embodiments, the calibration module 150 may also adjust optical powers of one or more varifocal lenses for each distance until the user indicates that the target object is in focus. The calibration module 150 may map the computed values of eye tracking functions to the depth information and/or optical power for the one or more varifocal lenses. The above process is repeated for a plurality of different depths (e.g., at least two). The calibration module 150 may then extrapolate and/or interpolate mappings for other gaze depths and/or optical power to corresponding values of eye tracking functions. Embodiments of this procedure are described in detail below.

The images captured for the calibration system are collected at a plurality of different known gaze depths (may be determined using depth sensing device 120). A known gaze depth is a known distance from the user to a target. In some embodiments, there is a single target that the user moves relative to in order to reach different known distances. Alternatively, there may be a plurality of targets that are each at different known distances from the user. The target is something a user's eyes can fixate on such that the user's gaze location can remain unchanged while the user rotates their head. An example target could be a geometric shape, a cross, some other image and/or physical object which the user's eyes can fixate on and maintain a stable gaze location while the user rotates their head, or some combination thereof. The plurality of different known gaze depths may be determined by, e.g., measurements taken by the user to a target, the depth sensing device 120 of the gaze depth system 100, a DCA of some other electronic device, using a standard (i.e., non-depth) outward facing camera in combination with one or more computer vision methods, or some combination thereof. In some embodiments, the calibration module 150 receives an indication from the user that the user is looking at the target at the known gaze depth. The indication may be created by the user selecting a button on a smart phone application associated with the gaze depth system 100. The user may also press a button on the device hosting the gaze depth system 100, such as a pair of eyeglasses, to indicate that they are looking at the target at the known gaze depth.

For example, in some embodiments, some other device (e.g., mobile phone, laptop, television, etc.) may display the target. In some embodiments, the controller 140 may communicate with the device and instruct the device to display the target. In some embodiments, the user may use an application on the device, retrieve the target from a website, etc. to cause the device to display the target. The calibration module 150 uses depth information from the depth sensing device 120 to measure the distance between the user and the target. Additionally, and/or alternatively, a standard camera (e.g., a selfie-camera on a mobile phone) may estimate depth based on, e.g., identifying the gaze depth system 100 in one or more image frames and estimating distance based on a known size and/or shape of the gaze depth system 100 in the one or more image frames.

In some cases, the calibration module 150 prompts the user to move closer to or farther from the target (e.g., displayed by device, physical object) until the user is within a threshold distance of a set distance value. For each known gaze depth, the module 150 prompts the user to focus on the target at the respective gaze depth through the varifocal lens assembly 170 and rotate their head (and therefore their eyes) so that the target moves through different positions within a field of view of the user while wearing the headset.

While this movement is occurring the camera assembly 110 captures images of the eyes of the user. The above process is repeated for at least one other known gaze depth (and potentially others). The controller may use the eye tracking parameters collected at the known gaze depths to compute values of eye tracking functions and fit a function that maps tracking parameters to corresponding gaze depths for other distances. The fitted function may be used as a model for determining gaze depth using combinations of the tracking parameters. The fitted function and model is further described with reference to FIG. 3.

In some embodiments, the calibration may occur using data from just two gaze depths. For example, while the user is wearing the gaze depth system 100, the user would look at a target at a first known distance. The controller may prompt the user to rotate their head and/or eye over their full range while maintain focus on the target. In some embodiments, the controller may provide feedback to the user to move their head to specific positions. The one or more eye tracking cameras would capture images of the eye during this process. The process would then repeat but for a second known distance. For example, the first known distance may be a close distance (e.g., 1 foot) and the second known distance may be a far distance (e.g., 300 feet or more). The controller may use the tracking parameters collected at the two distances to fit a function or model that maps tracking parameters to corresponding gaze depths for other distances. The eye tracking parameters and eye tracking functions can also be modeled to determine a measure of optical power needed for the user to focus at the known gaze depth. In some embodiments the user may indicate a distance at which they can focus on the target and input that distance to the gaze depth system. That distance is then used as the known gaze depth and allows the gaze depth system to identify an optical power needed to allow the user to focus at other gaze depths.

In some embodiments, the calibration module 150 may monitor the calibration and update it as needed in real time. For example, if the estimate of the gaze depth shows a user is systematically looking closer than the nearest possible focusing distance provided by the gaze depth system 100, the calibration module 150 may deem the previous calibration inaccurate and use the latest data to recalibrate to the closest possible distance provided by the gaze depth system 100. And in some embodiments, the gaze depth system 100 may have an initial calibration that is updated based on subsequent calibrations specific to the user.

In some instances, the gaze depth system 100 may shift position on the head of the user. For example, moving while using the varifocal lens assembly 170 may cause them to move a bit on the head of the user. Such movement, unless accounted for, can affect performance of the calibration. As noted above, the calibration is specific to a given view of the eyes, and movement without correction results in increased error in the received data. Accordingly, in some embodiments, the controller 140 monitors the position of the gaze depth system 100 on the head and compensates for motion of the gaze depth system 100 on the head. The controller 140 may monitor the position of the headset by analyzing the images captured of the eyes of the user. And in some cases, the gaze depth system 100 include one or more position sensors (e.g., inertial measurement units) that measure position information of the headset, and the controller may also, or alternatively use the measured position information to monitor the position of the headset. For example, as part of the calibration process performed by the calibration module 150 described above, in addition to determining the eye tracking parameters at different known gaze depths, the eye tracking parameters for different known gaze depths are also determined for different positions of the eyeglass on the head of the user. The eye tracking parameters could be collected with the gaze depth system 100 low on the nose, high on the nose, with some amount of rotation, etc. The controller can then update the model using the captured images for the different positions (and/or positional information from the one or more position sensors) and the corresponding eye tracking parameters. In this manner, the model can map a position of the headset and corresponding eye tracking parameters to a specific gaze depth.

Figure 2:
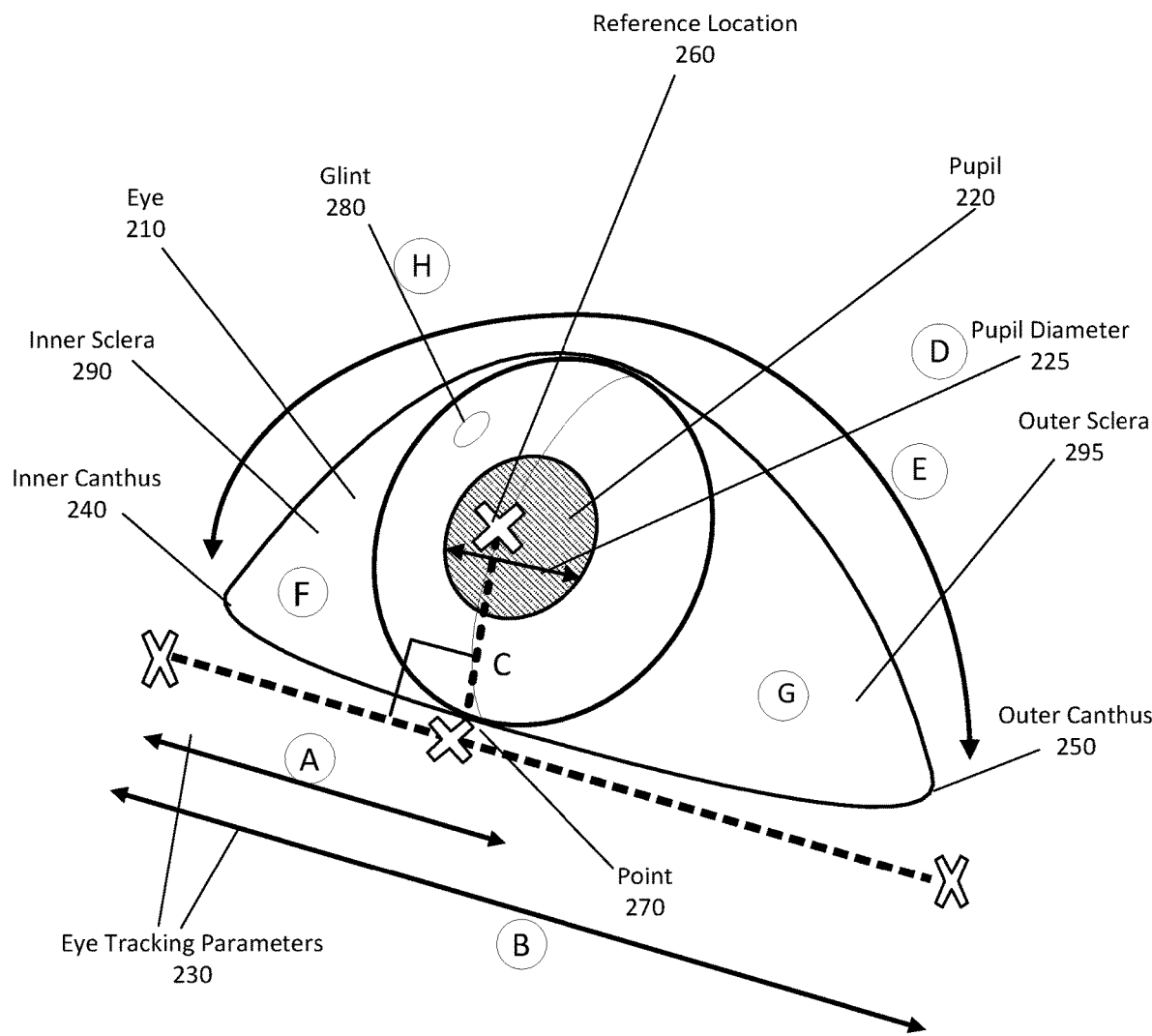
FIG. 2 is an illustration of an eye marked with eye tracking parameters in accordance with one or more embodiments.

FIG. 2 is an illustration of an eye 210 marked with eye tracking parameters 230 in accordance with one or more embodiments. The eye 210 may be similar to images captured by the camera assembly 110 and provided to the controller 140.

Using a captured image of the eyes of a user, the controller 140 identifies the positions of a pupil 220, inner canthus 240, outer canthus 250, the diameter 225 of the pupil 220, glints 280 projected onto the eye by illumination sources, the areas of the inner 290 or outer 295 sclera regions, or some combination thereof. With these locations, the controller 140 determines eye tracking parameters 230. The eye tracking parameters include A, B, C, D, E, F, G, H. Parameter B is the length of a horizontal axis across the eye. In some embodiments, B is the length of the horizontal axis connecting the inner canthus 240 and outer canthus 250. The controller 140 may identify a reference location 260 corresponding to a center of the pupil. Parameter A is defined as the length from one end point on the horizontal axis (e.g., the inner canthus 240) to a point 270 on the horizontal axis of B that is closest to the reference location 260 (e.g., the center of the pupil). In other words, if one drew a line perpendicular to the horizontal axis of B from the reference location to the a point 270 on the horizontal axis, A would be the distance from the inner canthus 240 to that point 270. In embodiments where the canthi are not the endpoints of the horizontal axis, A is measures as the distance from one endpoint to the location along the horizontal axis that is closest to the pupil. In some embodiments, the distance from the reference location 260 (at the center of the pupil) to the point 270 is additionally used as an eye tracking parameter and referred to as C. In some embodiments, parameter C and reference location 260 define a vertical axis of the eye that runs through the pupil. Parameter D is the diameter 225 of the pupil 220, defined as either or both the major and minor axis lengths of the pupil or a function of them, such as the average diameter. Parameter E is the length of the curve fit to the edge of the upper eyelid, which could alternatively or additionally be defined as the curve fit to the edge of the lower eyelid as well. Parameter F is the area of the inner scleral 290 region and Parameter G is the area of the outer scleral 295 region. Parameter H is the position of any glints 280 caused by specular reflections off the cornea generated by illuminators in the eye tracking system. These eye tracking parameters are then input into eye tracking functions to create a model. Each eye tracking parameter 230 A-H has a value for the left eye (e.g., Aleft) and a value for the right eye (e.g., Aright).

The process of determining the eye tracking parameters from captured images of the eye is performed on both eyes. In some embodiments the processing of images of the left and right eyes may be done simultaneously. In other embodiments, one eye may be analyzed for its eye tracking parameters followed by the next. The images of the left eye and right eye used to determine the eye tracking parameters should be taken at the same time (e.g., within one tenth of a second of each other) to prevent error from the user moving their eyes between images. Data from both eyes is used to determine gaze depth. The frame rate of the imaging device capturing the images of the eye may be set to a high enough frequency to align images of both eyes being taken within a threshold length of time (e.g., the one tenth of a second).

In some embodiments, the gaze depth system 100 may be used by the user in conjunction with hearing aids that are also worn by the user. It is common for hearing aids to include a plurality of microphones, and in some cases the hearing aids can perform beamforming to improve directional sensitivity. In some embodiments, the gaze depth system 100 may include a microphone array. The hearing aids can use the sound from the microphone array to help improve the beamforming performance. Additionally, in some embodiments, the gaze depth system 100 can beamform based on depth to a sound source (e.g., by changing the relative loudness of the omnidirectional and directional microphones). In some embodiments, the hearing aids may also be configured to couple (e.g., via magnetic attachment) to the gaze depth system 100 to, e.g., facilitate positioning of the hearing aid. Additionally, the hearing aid could offload components (e.g., processing capability, battery, etc.) to the headset, thereby reducing form factor and complexity of the hearing aid. Moreover, data from the hearing aids could be used to improve gaze depth estimation by the controller.

Note that the gaze depth system 100 described herein have a plurality of uses in addition to those described above. Applications in digital health, multisensory augmentation, augmented reality, fall detection, human-computer interaction, drowsiness detection (e.g., while driving), monitoring progression of neurological diseases, alerts/reminders (e.g., for prescriptions), cognitive load monitoring, behavioral analysis, etc.

Figure 3:
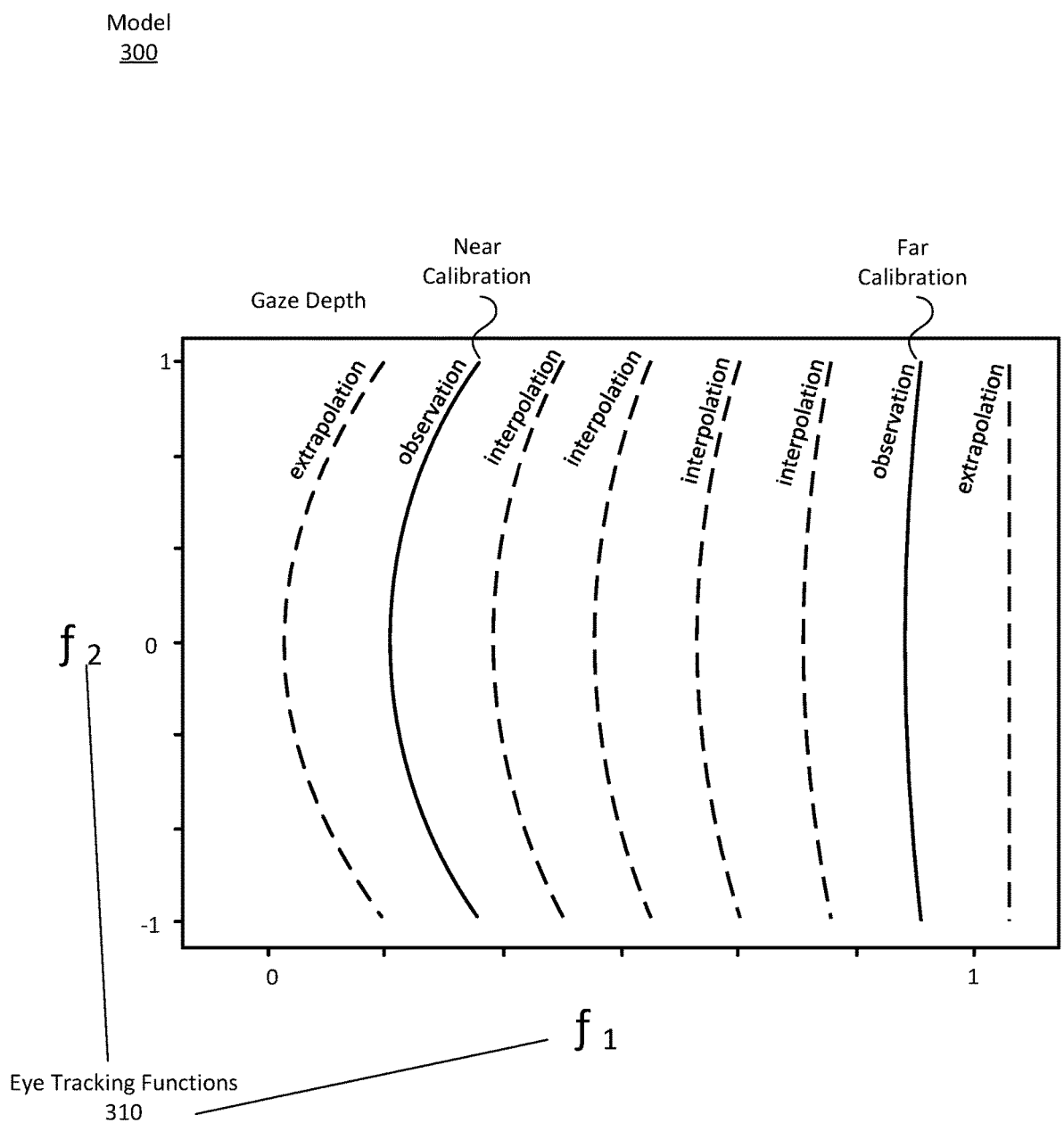
FIG. 3 is a graph of the eye tracking functions and gaze depths in accordance with one or more embodiments.

FIG. 3 is a model 300 of the eye tracking functions 310 and related gaze distance values in accordance with one or more embodiments. Once the controller has the eye tracking parameters 230, the eye tracking functions 310 can be evaluated to model the gaze depth of the user. In some embodiments the eye tracking functions 310 are:

$$\frac{ALeft}{BLeft} - \frac{ARight}{BRight}, \text{ and} \tag{1}$$

$$\frac{ALeft}{BLeft} + \frac{ARight}{BRight} \tag{2}$$

In this embodiment of (1) and (2) consider ALeft and BLeft are the eye tracking parameters 230 of the left eye of the user and ARight and BRight are the eye tracking parameters 230 of the right eye. (1) and (2) may be the difference and sum of the ratio of the A and B parameters for each eye. For example, if the user is looking straight ahead at an object far away (e.g., horizon), the gaze angles for each eye are approximately parallel meaning that ALeft/BLeft and ARight/BRight will be close to equal considering the straight-ahead symmetry of the gaze. Under these conditions, the sum of the ratios A/B is some reference value for far gaze, which can be normalized to 1 and the difference of the ratios A/B is approximately 0. However, as the user looks straight ahead at an object close to them, 1 foot away for example, their eyes will verge causing each of the pupils to move towards each other. And as the object is directly in front of the user, both pupils will be relatively closer to the inner canthi than the outer canthi than the far distance case, resulting in ALeft/BLeft and ARight/BRight, for example, being less than in the far distance case such that the normalized sum (with the same factor) is less than 1, say 0.5. The difference value is still 0 in this example as the user is still looking straight ahead. These values correlate to an optical power of 3.5 diopters for the user to focus on an object close to them. As such, gaze depth increases from left to right in the figures, and optical power reduces as distances increases. The sum value may provide an indication of how close or far away the object the user is looking at is while the difference value may indicate whether the user is looking straight ahead or to the side. This basic example illustrates only one form of the eye tracking functions utilizing only parameters A and B. In some embodiments, the remaining eye tracking parameters may be added to the eye tracking functions (1) and/or (2) such that they are dependent on all or some combination of the parameters. In some embodiments, the (1) and/or (2) may be replaced with eye tracking functions that depend on some or all of the parameters A-H (e.g., $f_1$(A, B, C, D, E, F, G, H) and $f_2$(A, B, C, D, E, F, G, H). The additional parameters may account for features of the eye tracking functions that more accurately correlate to the user's gaze or otherwise improve robustness to slippage or calibration errors. The outputs of the functions 310 are graphed with equation (1) on the y axis and equation (2) on the x axis. Each curve on the model 300 associates eye tracking functions to a single gaze depth and optical power associated with the single gaze depth. The two solid curves on the model 300 may be the result of a calibration in which the user was told to look at a far known gaze depth and a near known gaze depth. The dashed curves are then extrapolated from the data of the two solid curves to estimate the eye parameters of the user at different gaze depths not tested in the calibration. Each curve is associated with a diopter value corresponding to the optical power of the varifocal lens assembly 170 needed at that gaze depth. As shown, the diopter values of the two calibration gaze depths are 0.5 D and 3.0 D while the other values from 0-3.5 D have been extrapolated. In other embodiments, other optical powers and/or other gaze depths may be used during calibration. Each diopter value indicates an optical power associated with allowing the user to focus on an object at a given gaze depth.

In some embodiments a third eye tracking function is used with one or more of the first and second functions to model gaze depth. The third eye tracking function is the average of CLeft and CRight. CLeft is a distance between a center of the left pupil and a point closest to the center of the left pupil on the horizontal axis of the left eye. CRight is a distance between a center of the right pupil a point closest to the center of the right pupil on the horizontal axis of the right eye. Further eye tracking parameters including D, E, F, G, and H may also be used to calculate the eye tracking functions.

Figure 4:
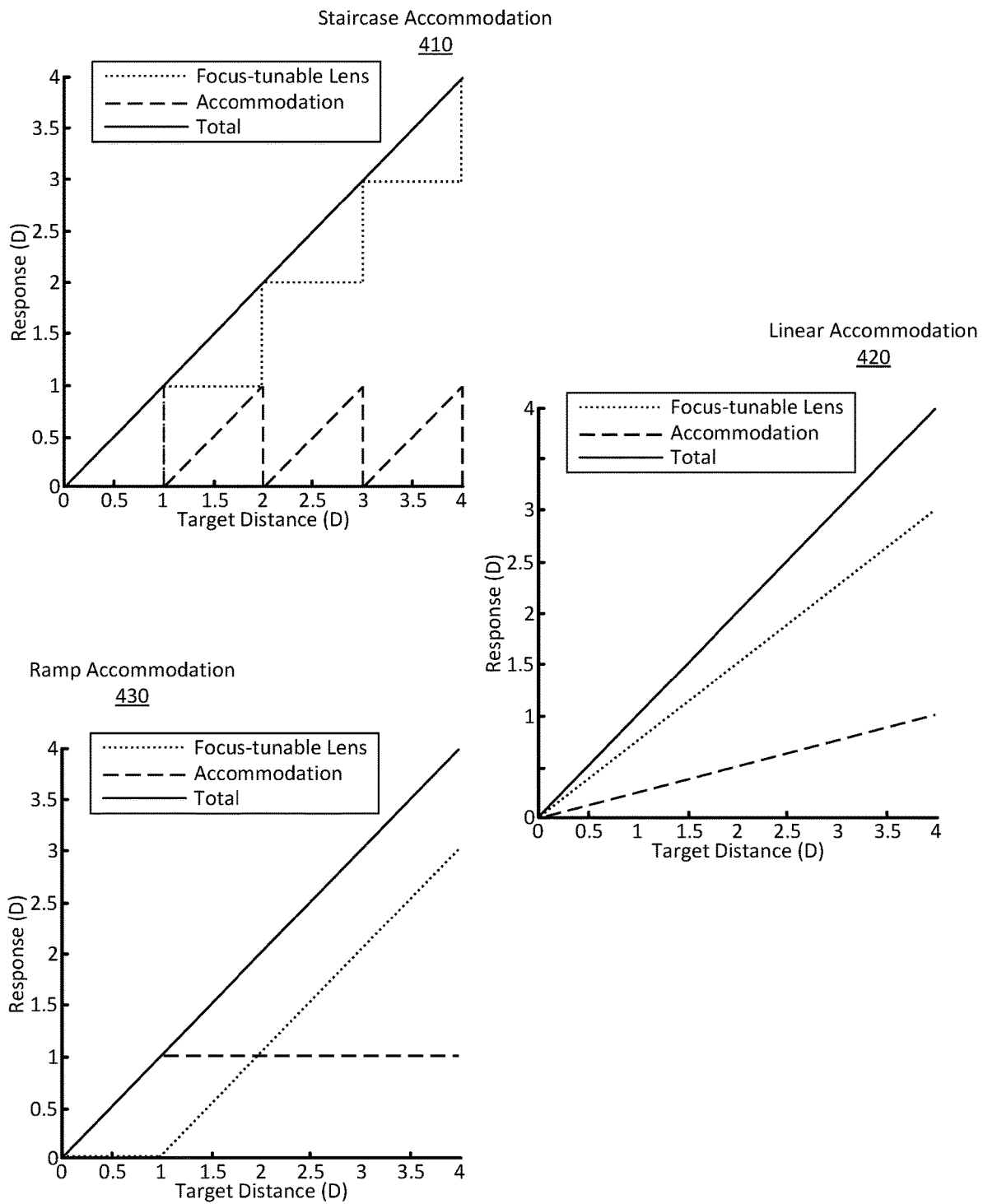
FIG. 4 illustrates three possible applications of accommodation in accordance with one or more embodiments.

FIG. 4 illustrates three possible applications of accommodation in accordance with one or more embodiments. A user's residual accommodation is determined by the calibration module 150 of the controller 140. The gaze depth system 100 then adjusts a model, such as model 300, to reflect the residual accommodation of the user and note where the user needs their range of accommodation expanded. Accommodation by the gaze depth system 100 may occur when the gaze depth system 100 is used with a varifocal (e.g., focus tunable) lens. The behavior of the varifocal lens may be changed in response to a user's residual accommodation. The gaze depth system 100 may use the residual accommodation in a variety of ways. For example, the graphs of FIG. 4 show respectively a staircase 410 application of residual accommodation, a linear 420 application of residual accommodation, and a ramp 430 application of accommodation. The graphs each show a way of applying additional range of accommodation to the user's residual accommodation to allow the user to focus at a complete range of distances. The specific use of residual accommodation can be selected to maximize eye comfort of the user.

In the ramp accommodation 430 graph, the residual accommodation of the user is between 0 and 1 diopters (D). Note that D is used herein to refer to Diopters and target distance, both of which are measured in units of 1/distance. For example, a D of 0 means the gaze depth is at infinity (e.g., as far as the user can see, such that the gaze vectors from the eyes are essentially parallel). Responsive to the residual accommodation of the user, the varifocal lens is adjusted by the gaze depth system 100 to accommodate for the rest of the visual range. The ramp accommodation adds to the user's residual accommodation starting at a distance of 1D. After 1D the varifocal lens adds an additional offset to the user's residual accommodation to achieve a full range of accommodation. For example, between 0D and 1D, the residual accommodation of the eye is sufficient to focus on objects. And between 1D and 2D, the varifocal lens adds 1D of optical power and uses the residual accommodation of the eye to achieve the target 1-2D of optical power. So, at, e.g., a distance of 2D, the varifocal lens provides 1D of optical power, the user's eye provides 1D of optical power (via residual accommodation), and together the eye and the varifocal lens provide the target 2D of optical power.

The staircase accommodation 410 uses discrete changes in focus-tunable lens states, which may ease design constraints as the lens may only support a small number of finite optical powers. However, the steps in lens power may result in non-intuitive and uncomfortable visual experience for the user as they are forced to make large residual accommodation adjustments in their own eye to follow the lens state.

The linear accommodation 420 scheme may result in the most natural experience for the user, as the added power is smoothly applied according to the needs of the user's remaining accommodation at every distance. This requires a continuously adjustable lens over a wide range of optical power, which may complicate system requirements.

The ramp accommodation 430 similarly uses continuously adjustable lens power, but across a smaller total optical range, which may be easier to implement than the linear accommodation 420. However, the user's full residual accommodation will be engaged at most gaze depths, possibly leading to increased eye strain.

Figure 5:
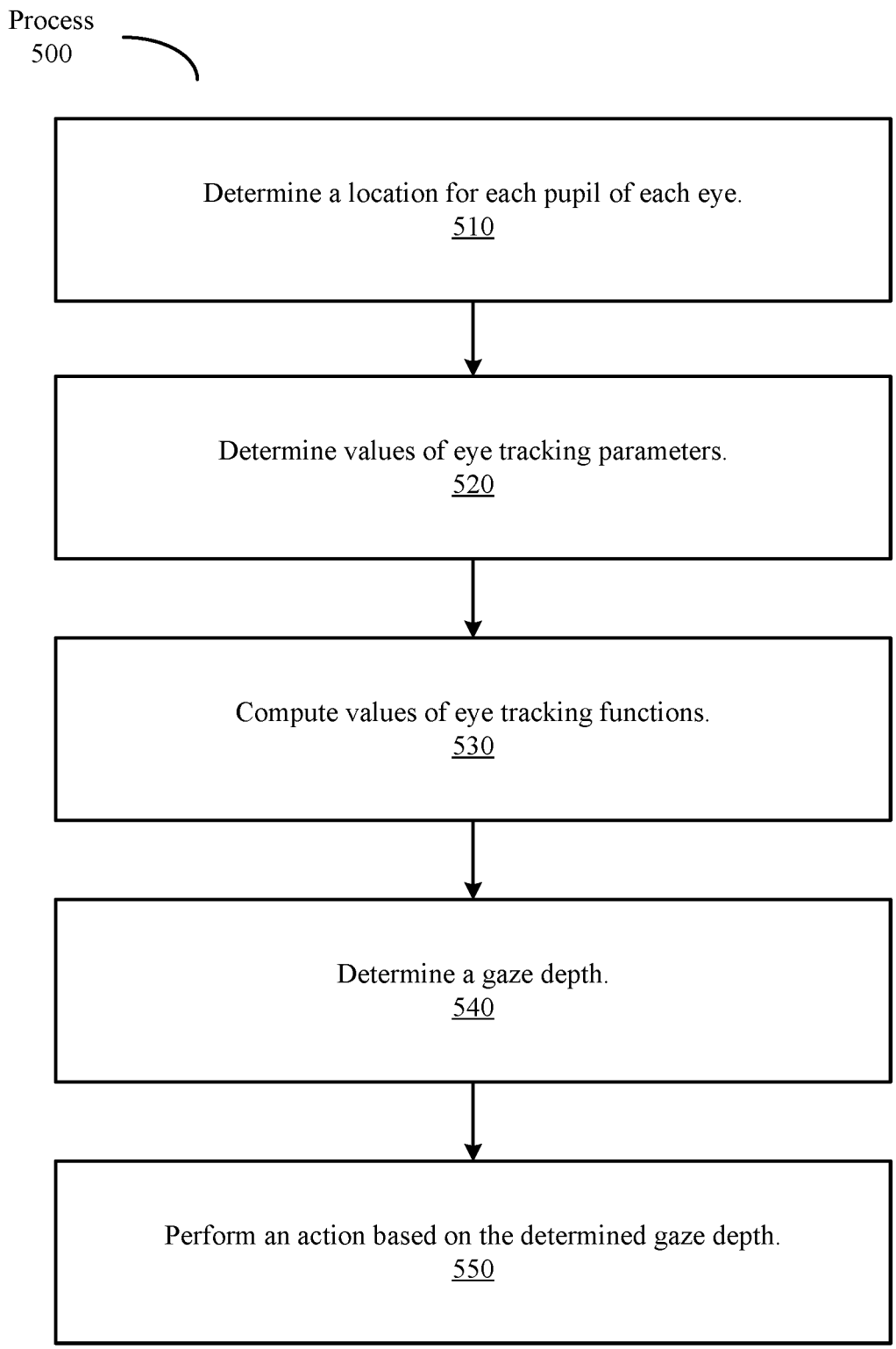
FIG. 5 is a flowchart of a process for determining gaze depth using eye tracking functions in accordance with one or more embodiments.

FIG. 5 is a flowchart a gaze depth system 100 process 500 for determining gaze depth using eye tracking functions in accordance with one or more embodiments. The process shown in FIG. 5 may be performed by components of a varifocal system (e.g., gaze depth system 100). Other entities may perform some or all of the steps in FIG. 5 in other embodiments. Embodiments may include different and/or additional steps or perform the steps in different orders.

The gaze depth system 100 determines 510 a location for each pupil of each eye. The location of each pupil may be referred to as the reference location. The reference location is determined via image processing of an image captured by the camera assembly 110. In some embodiments the pupil is located by the controller 140 using an object identifying classifier. At this step the inner and outer canthi and any other features required for eye tracking parameters such as the eyelid edge, glints, scleral areas, or pupil diameter are additionally identified by the controller 140 and their locations noted.

The gaze depth system 100 determines 520 values of the eye tracking parameters. The eye tracking parameters can be calculated based on the distance between two endpoints of a horizontal axis of the eye (B). In some embodiments the canthi are the endpoints. The distance of the pupil from a horizontal axis of the eye (A) is also an eye tracking parameter. In some embodiments the vertical distance from the center of the pupil to the horizontal axis is an additional eye tracking parameter, C. Often, the eye parameters of the left and right eyes of a user differ slightly, though in some instances they are the same.

The gaze depth system 100 computes 530 values of the eye tracking functions. The eye tracking functions are computed from the various eye tracking parameters A-H, for example the sum and difference of the ratios of eye tracking parameters A and B of each eye as determined from the image captured by the camera assembly 110. The sum and difference of the ratios from these eye tracking functions are discussed in reference to FIG. 3. In some embodiments, additional eye tracking parameters C-H are used in the eye tracking functions.

The gaze depth system 100 determines 540 a gaze depth based on the values of the eye tracking functions. The controller 140 accesses a model 300 fitting the eye tracking functions of a user to gaze depths. The controller 140 may input the values of the tracking functions to the model 300 as graph coordinates and evaluate which gaze depth the values correspond to.

The gaze depth system 100 performs 550 an action based on the determined gaze depth. In some embodiment, the action performed is providing a measure of optical power relating to the determined gaze depth. The gaze depth system 100 may then adjust a varifocal lens to the optical power provided (e.g., a diopter value). The measure of optical power is based on the model 300 and values of the eye tracking functions. Additional actions may occur such as triggering a calibration event to increase the accuracy of the model or triggering an accommodation event to evaluate the residual accommodation of the user.

Figure 6:
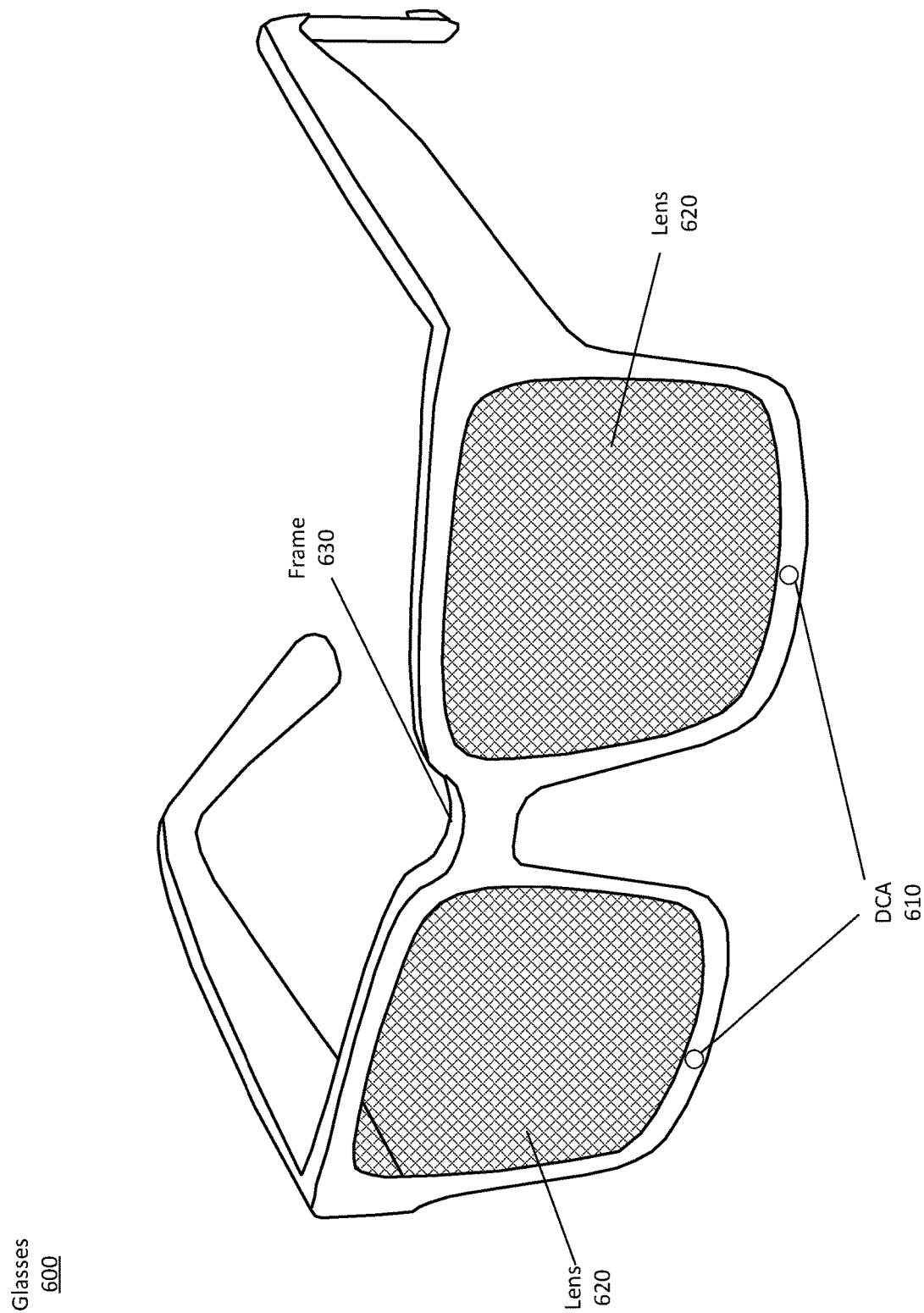
FIG. 6 is an example of a pair of glasses that include a system in accordance with one or more embodiments.

FIG. 6 is an example of a pair of glasses 600 that include a gaze depth system in accordance with one or more embodiments. The gaze depth system may be, e.g., the gaze depth system 100. A frame 630 holds the components of the gaze depth system. The frame 630 includes a front part that holds one or more varifocal lenses (e.g., the varifocal lens assembly 170) and end pieces (e.g., temples) to attach to a head of the user. A front part of the frame 630 bridges the top of a nose of the user. The length and/or shape of the end pieces may be adjustable (e.g., adjustable temple length, customized to a head geometry of a user) to fit different users. The end pieces may also include a portion that curls behind the ear of the user (e.g., temple tip, earpiece).

The glasses 600 include outward facing DCAs 610 for sensing the depth of objects within the field of view of the user of the glasses 600. The glasses 600 additionally include one or more imaging devices (not shown) that monitor the position of the pupils of the eyes of a user.

A power assembly provides power to the gaze depth system 100. The power assembly may be internal to the eyeglasses 600. The power assembly includes one or more batteries. In some embodiments, the power assembly is sealed within the eyeglasses (e.g., within the frame 630). In some embodiments, an external recharger is used to charge the power assembly. The external recharger is a battery that is charged separately and is then used to charge the power assembly of the eyeglasses. The power assembly may be configured to be charged by the external charger wirelessly and/or via a pogo pin style connector. The external recharger and/or the eyeglasses may be configured with one or more magnets to further secure them together during the charging process. The external charger may be designed to conform to the eyeglasses so that the user can wear the eyeglasses while they are being charged by the external recharger. In this manner, the user may wear and use the eyeglasses while the external recharger is coupled to the eyeglasses. And once the user is satisfied with the level of charge of the eyeglasses, the user can remove the external charger.

In each of the following figures, the lenses are embodiments of the varifocal lens assembly 170 while the imaging devices are embodiments of the camera assembly 110.

There are a variety of ways in which the camera assembly 110 can capture images of the eyes of the user. FIGS. 7 through 10 illustrate some of the configurations of the camera assembly 110 in embodiments in which the gaze depth system 100 is hosted on a pair of eyeglasses. FIGS. 7-10 illustrate only one eye and one side of an eyeglass frame for simplicity of illustration. In actual embodiments the gaze depth system may have both a left side and right side for capturing images of the left and right eyes as well as adjusting the optical power of a varifocal lens for each eye.

Figure 7:
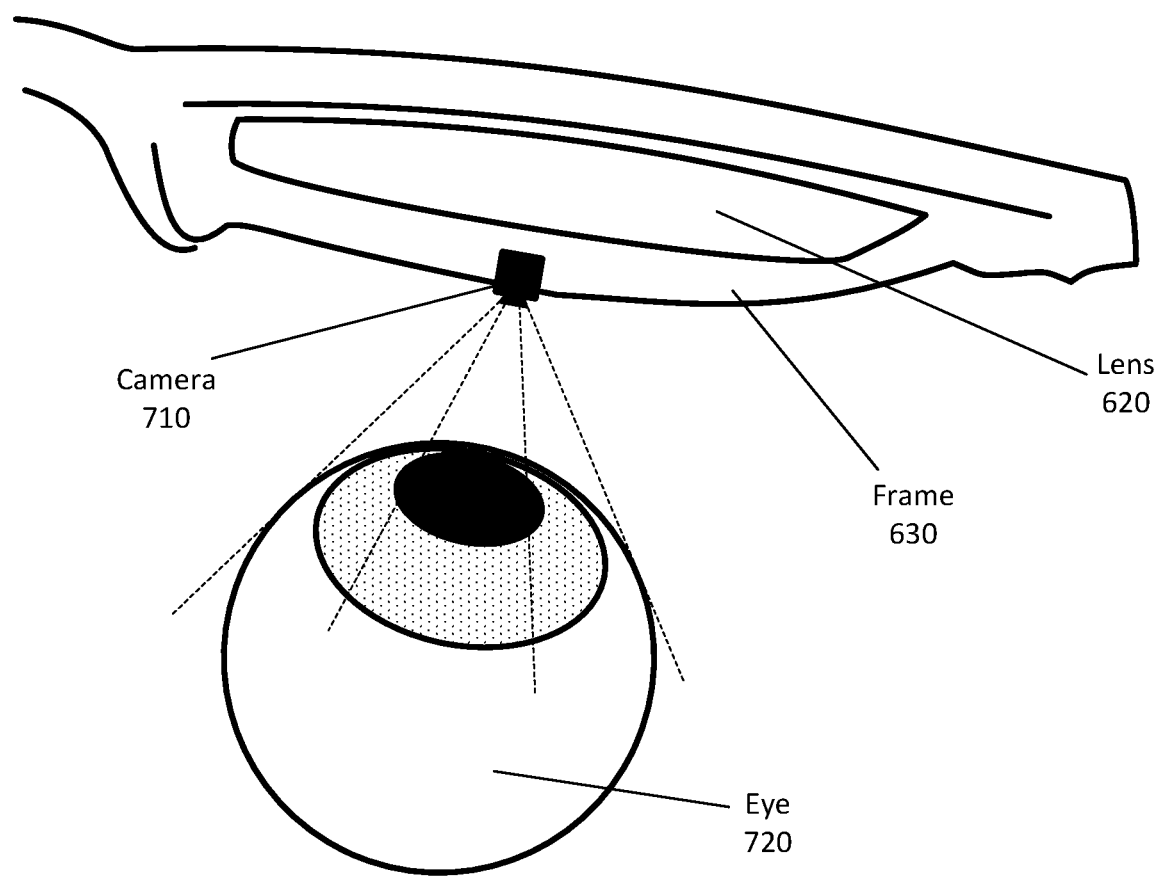
FIG. 7 is a top and an inside view of an eyeglasses configuration having a camera attached to a frame in accordance with one or more embodiments.

FIG. 7 is a top and an inside view of an eyeglasses configuration 700 having a camera 710 attached to the frame 630 in accordance with one or more embodiments. In the shown embodiment, the lens 620 (an embodiment of varifocal lens assembly 170) is supported by the frame 630. The frame 630 additionally houses an imaging device 710 that is configured to capture images of an eye 720 of the user.

The camera 710 is angled to have at least the canthi and pupil of the eye 720 of the user within a FOV of the camera 710. The camera 710 captures images of the eye 720 as the eye moves and transmits the captured images to a controller (e.g., the controller 140) for processing. In similar embodiments, the camera 710 is located in a temple of the frame 630 rather than the bottom of the frame 630 as shown.

In some embodiments, the glasses of configuration 700 additionally include illumination devices. The illumination devices allow for the camera 710 to continue to capture clear images of the eye 720 in low light environments. The illumination device, in some embodiments, outputs light in the infrared (IR) spectrum such that the light is not visible by the user. In this embodiment, the camera 710 is configured to capture IR images.

Figure 8:
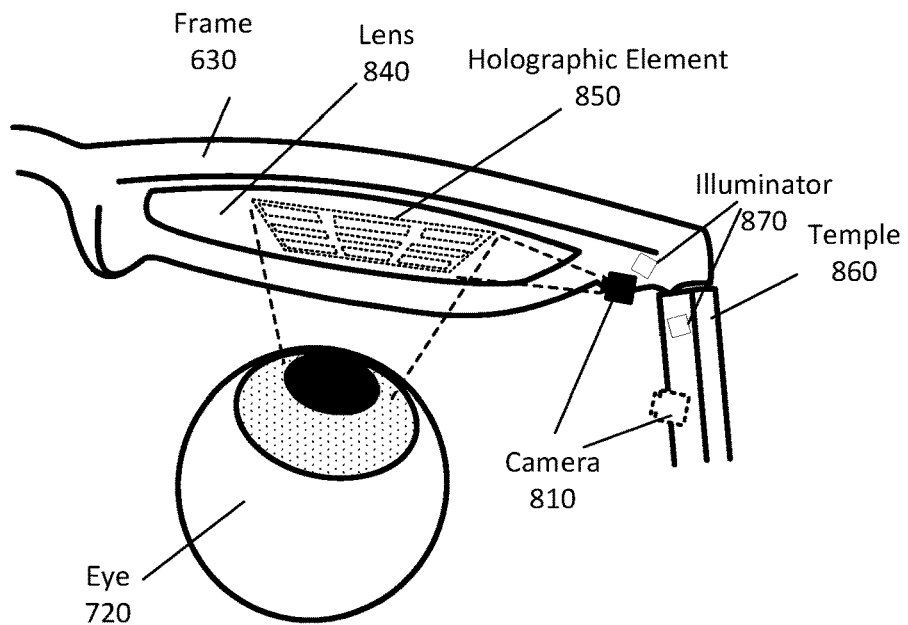
FIG. 8 is a top and an inside view of an eyeglasses configuration having embedded holographic elements in accordance with one or more embodiments.
Figure 8:
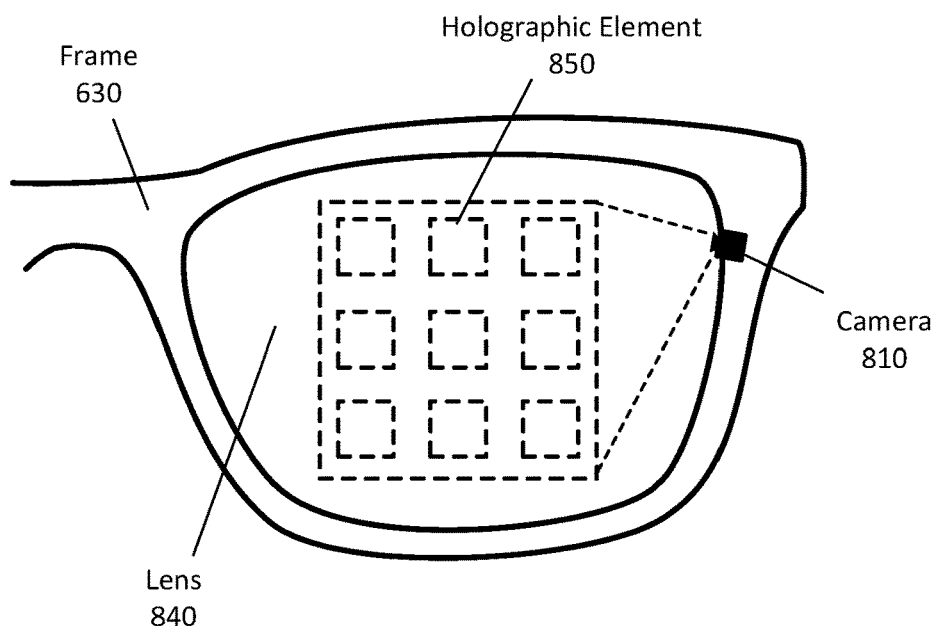

FIG. 8 is a top and an inside view of an eyeglasses configuration 800 having an embedded holographic element 850 in accordance with one or more embodiments. Similarly to the embodiment of FIG. 7, the embodiment of FIG. 8 has a camera 810 attached to the frame 630.

As shown, the frame 630 is configured to hold a lens 840 in front of the eye 720. The frame 630 may include temple portions (e.g., temple 860) that extend from the temple of the user to behind their ears. The temple portions are configured to support the eyeglasses of configuration 800 on the user's ears. The frame additional may include a nose portion configured to rest on the nose of the user. The frame holds two lenses, each lens supported in front of each eye of the user.

A camera 810 may be located on an inside surface of the frame 630 and/or on a temple (e.g., the temple 860). The camera 810 is angled toward a lens 840 (an embodiment of varifocal lens assembly 170). The camera 810 captures IR reflections of the eye 720. The IR reflections of the eye 720 are redirected toward the camera 810 by one or more holographic optical elements 850 embedded within the lens 840.

In some embodiments, the holographic optical elements 850 reflect only IR light and the imaging device 810 is configured to capture IR images of the eye 720. The holographic optical elements 850 are made of holographic recording materials and function as volume gratings or volume holograms that function to reflect IR light. The camera 810 is pointed at the holographic optical elements 850 so that light reflected off the eye 720 and the surrounding features is directed into the camera 810 after reflecting off the holographic optical elements 850. In some embodiments there is an IR illuminator 870 configured to emit IR light to reflect off the eye 720 and be captured by the camera 810. The illuminator 870 allows the camera 810 to capture images of the eye 720 even when ambient light is low. The illuminator 870 may be positioned to reflect IR light off of the holographic optical element 850 or emit IR light directly to the eye 720.

Figure 9:
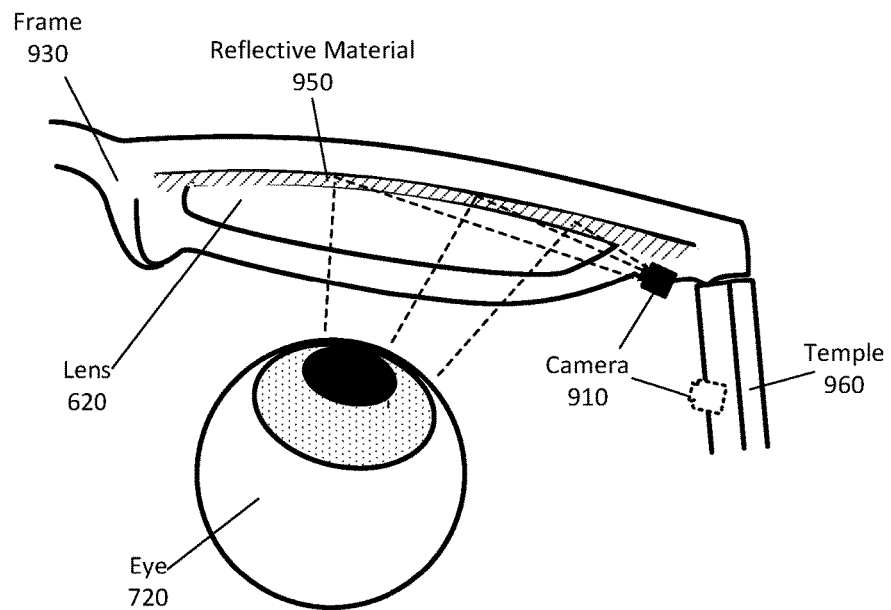
FIG. 9 is a top and an inside view of an eyeglasses configuration having a frame that is partially coated with a reflective material in accordance with one or more embodiments.
Figure 9:
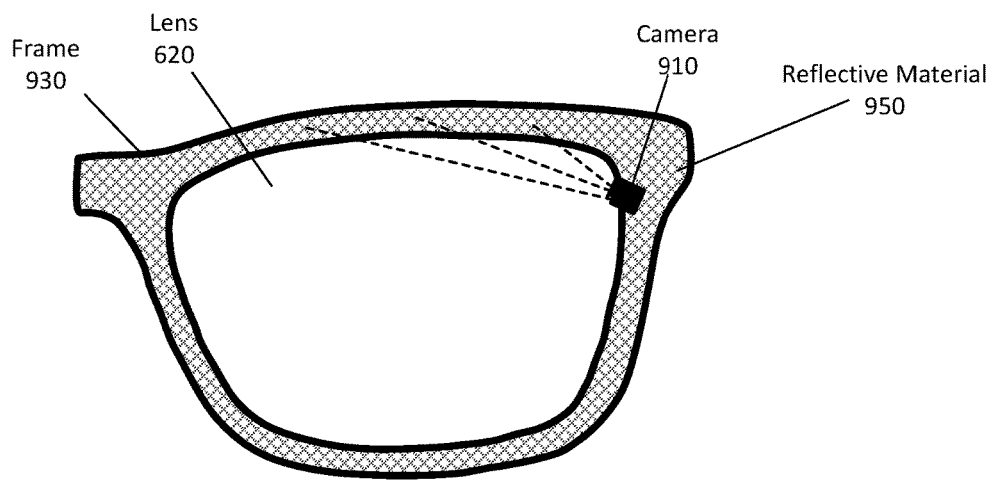

FIG. 9. is a top and an inside view of an eyeglasses configuration 900 having a frame 930 that is partially coated with a reflective material 950 in accordance with one or more embodiments.

The frame 930 is configured to hold a lens 620 in front of an eye 720 of a user. The frame 930 may include temple portions (e.g., temple portion 960) that extend from the temple of the user to behind their ears. The temple portions are configured to support the eyeglasses of configuration 900 on the user's ears. The frame additional may include a nose portion configured to rest on the nose of the user. The frame holds two lenses, each lens 620 supported in front of each eye of the user.

The frame 930 is additionally coated, inlayed, or otherwise coupled to a reflective material 950. The reflective material may be Calcium fluoride, fused silica, germanium, magnesium fluoride, N-BK7, potassium bromide, sapphire, silicon, sodium chloride, zinc selenide, zinc sulfide, or other reflective materials. In addition to these materials, a dielectric mirror, optical metasurface, or holographic optical element tuned to reflect IR light can also be embedded in the frame to reflect light. In some embodiments the reflective material 950 is a film that is adhesively coupled to the frame 930. In other embodiments the frame 930 is partially or wholly made of the reflective material 950. The reflective material 950 redirects lights toward the camera 910, allowing the camera 910 to capture an image of the eye 720 without being pointed directly at the eye. In some embodiments, the glasses of configuration 900 may also include one or more illumination devices. The illumination devices are configured to illuminate the eye 720. In some embodiments, the illumination devices may be part of the camera 910. The illumination device, in some embodiments, outputs light in the infrared (IR) spectrum such that the light is not visible by the user, and the camera 910 is configured to capture IR images of the eye 720.

In this embodiment, the camera 910 is attached to the frame 930 or the temple 960 and is angled at a portion of the frame 930 that is coated with a reflective material 950. The frame 930 may be coated entirely in the reflective material 950 or only coated on a portion of the frame 930. In some embodiments, the reflective material 950 only reflects IR light and the camera 910 is configured to capture infrared images.

Figure 10:
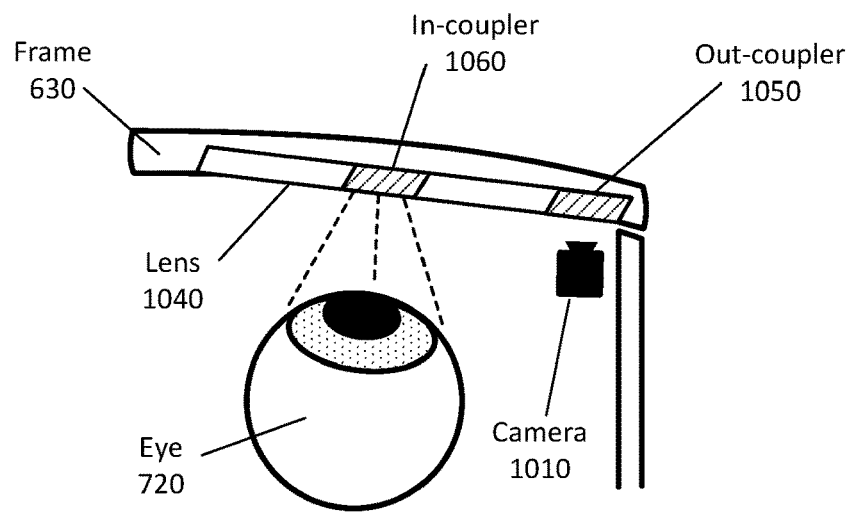
FIG. 10 is a top and an inside view of an eyeglasses configuration having a wave guide with an in-coupler and out-coupler in accordance with one or more embodiments.
Figure 10:
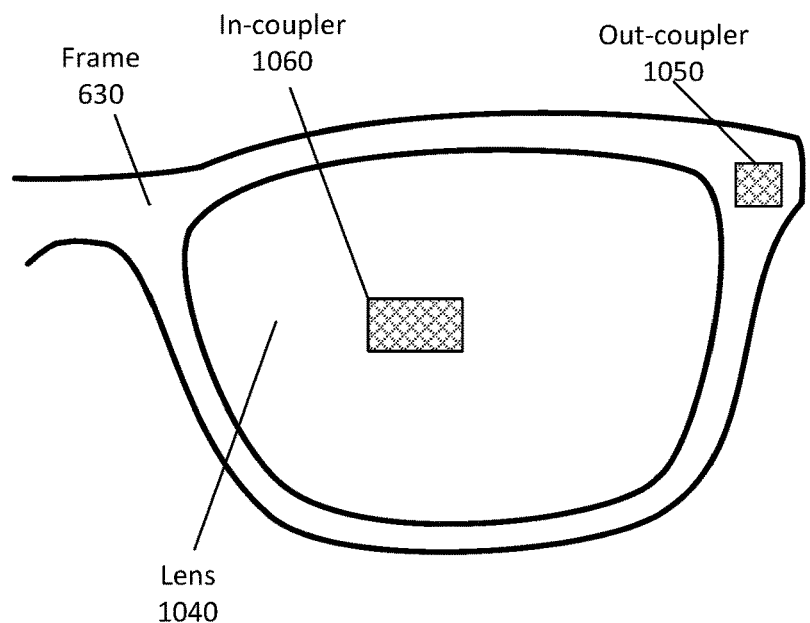

FIG. 10 is a top and an inside view of an eyeglasses configuration 1000 having a waveguide with an in-coupler 1060 and out-coupler 1050 in accordance with one or more embodiments.

A frame 630 is configured to hold a lens 1040 in front of the eye 720. The frame 630 may include temple portions that extend from the temple of the user to behind their ears. The temple portions are configured to support the eyeglasses of configuration 1000 on the user's ears. The frame additional may include a nose portion configured to rest on the nose of the user. The frame holds lenses 1040 (embodiments of the varifocal lens assembly 170), each is supported in front of each eye of the user.

In the illustrated embodiment a camera 1010 is coupled to a temple of the frame 630. In this embodiment, the lens 1040 (an embodiment of the varifocal lens assembly 170) acts as a waveguide by internally reflecting light passed in to the in-coupler 1060 and releasing the light at the out-coupler 1050. The couplers 1050 and 1060 may be gratings that in-couple and out-couple light to/from the waveguide. The in-couplers and out-couplers can be simple prisms, microprism arrays, embedded mirror arrays, surface relief gratings (SRGs), thin or thick analog holographic gratings, optical metasurfaces, or resonant waveguide gratings (RWGs). The waveguide itself can be flat or curved. Light from the eye 720 is in-coupled into the waveguide via the in-coupler 1060 and is later output from the waveguide via the out-coupler 1050 to the camera 1010.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A device comprising:
a camera assembly configured to capture images of both eyes of a user;
a controller configured to:
determine a location for each pupil of each eye of the user using the captured images;
determine values of eye tracking parameters using the captured images and the determined locations for each pupil,
compute values of eye tracking functions using the values of the eye tracking parameters,
determine a gaze depth of the user using the computed values and a model that maps the computed values of the eye tracking functions to various gaze depths, and
perform an action based on the determined gaze depth.

2. The device of claim 1, wherein the eye tracking parameters describe a first horizontal axis across for a left eye of the user, a second horizontal axis for a right eye of the user, a first distance along the first horizontal axis to a first reference location on the first horizontal axis closest to a determined pupil location for the left eye, and a second distance along the second horizontal axis to a second reference location on the second horizontal axis closest to a determined pupil location for the right eye.

3. The device of claim 2, wherein the first horizontal axis is a line connecting an outer canthus of a left eye to an inner canthus of the left eye, and the second horizontal axis is a line connecting an outer canthus of a right eye to an inner canthus of the right eye.

4. The device of claim 2, wherein the eye tracking functions comprise:

$$\frac{ALeft}{BLeft} - \frac{ARight}{BRight}, \text{ and}$$

$$\frac{ALeft}{BLeft} + \frac{ARight}{BRight}$$

wherein the eye tracking parameters are referred to as ALeft, ARight, BLeft, and B Right, and
BLeft is a length of the first horizontal axis,
BRight is a length of the second horizontal axis,
ALeft is the first distance along the first horizontal axis to the first reference location, and
ARight is the second distance along the second horizontal axis to the second reference location.

5. The device of claim 4, wherein the eye tracking parameters further comprise CLeft, and CRight, wherein
CLeft is a distance between a center of a left pupil and the first reference location, and
CRight is a distance between a center of a right pupil and the second reference location,
wherein the eye tracking functions further comprise an average of CLeft and CRight.

6. The device of claim 1 wherein the model that maps values of the eye tracking functions to various gaze depths is created from data comprising eye tracking parameters gathered at two or more gaze depths, and wherein the data is linearly interpolated to estimate values of the eye tracking functions at gaze depths between the gaze depths of the data and extrapolated to estimate values of the eye tracking functions at gaze depths beyond the gaze depths of the data.

7. The device of claim 1 wherein the device is a headset that includes a varifocal assembly having a varifocal lens whose optical power is adjustable over a range of optical powers, wherein the performed action comprises dynamically adjusting the optical power of the varifocal lens based in part on the determined gaze depth.

8. The device of claim 7, wherein an amount of adjustment of the optical power is based in part on a residual accommodation of an eye of the user.

9. The device of claim 1 wherein the controller is further configured to:
receive a first set of images of the eyes wherein the eyes are looking at a first gaze depth;
receive a second set of images of the eyes wherein the eyes are looking at a second gaze depth different than the first gaze depth;
determine values of first eye parameters and values of second eye parameters based on the first set of images and the second set of images image;
determine a set of first values for the eye tracking functions using the values of the first set eye parameters, and a set of second values for the eye tracking functions using the values of the second set of eye parameters; and
fit a function mapping the first values and the second values to the first gaze depth and the second gaze depth.

10. A method comprising:
determining a location for each pupil of each eye of a user using one or more captured images;
determining values of eye tracking parameters using the captured images and the determined locations for each pupil,
computing values of eye tracking functions using the values of the eye tracking parameters,
determining a gaze depth of the user using the computed values and a model that maps values of the eye tracking functions to various gaze depths, and
performing an action based on the determined gaze depth.

11. The method of claim 10 wherein the eye tracking parameters describe a first horizontal axis across for a left eye of the user, a second horizontal axis for a right eye of the user, a first distance along the first horizontal axis to a first reference location on the first horizontal axis closest to a determined pupil location for the left eye, and a second distance along the second horizontal axis to a second reference location on the second horizontal axis closest to a determined pupil location for the right eye.

12. The method of claim 11 wherein the first horizontal axis is a line connecting an outer canthus of the left eye to an inner canthus of the left eye, and the second horizontal axis is a line connecting an outer canthus of the right eye to an inner canthus of the right eye.

13. The method of claim 11 wherein the eye tracking functions are:

$$\frac{ALeft}{BLeft} - \frac{ARight}{BRight}, \text{ and}$$

$$\frac{ALeft}{BLeft} + \frac{ARight}{BRight}$$

wherein the eye tracking parameters are referred to as ALeft, ARight, BLeft, and B Right, and
BLeft is a length of the first horizontal axis,
BRight is a length of the second horizontal axis,
ALeft is the first distance along the first horizontal axis to the first reference location, and
ARight is the second distance along the second horizontal axis to the second reference location.

14. The method of claim 13 wherein the eye tracking parameters further comprise Cleft, and CRight, wherein:
CLeft is a distance between a center of a left pupil and the first reference location, and
CRight is a distance between a center of a right pupil and the second reference location,
wherein the eye tracking functions further comprise an average of CLeft and CRight.

15. The method of claim 10 wherein the model that maps values of the eye tracking functions to various gaze depths is created from data comprising eye tracking parameters gathered at two or more gaze depths, and wherein the data is linearly interpolated to estimate values of the eye tracking functions at gaze depths between the gaze depths of the data and extrapolated to estimate values of the eye tracking functions at gaze depths beyond the gaze depths of the data.

16. The method of claim 10 further comprising:
receiving light from a local area;
refracting the light with a variable optical power based on the determined gaze depth; and
providing the refracted light to an eyebox;
wherein the performed action comprises adjusting the optical power of a varifocal assembly.

17. The method of claim 16 further comprising:
dynamically adjusting the optical power according to a residual accommodation of the eyes of a user.

18. The method of claim 10 further comprising:
receiving a first set of images of the eyes wherein the eyes are looking at a first gaze depth;
receiving a second set of images of the eyes wherein the eyes are looking at a second gaze depth different than the first gaze depth;
determining values of first set of eye parameters and values of second set of eye parameters based on the first set of images and the second set of images image;
determining a set of first values for the eye tracking functions using the values of the first set eye parameters, and a set of second values for the eye tracking functions using the values of the second set of eye parameters; and
fitting a function mapping the first values and the second values to the first gaze depth and the second gaze depth.

19. A non-transitory computer readable medium configured to store program code instructions, when executed by a processor of a device, cause the device to perform steps comprising:
determining a location for each pupil of each eye of a user using one or more captured images;
determining values of eye tracking parameters using the captured images and the determined locations for each pupil,
computing values of eye tracking functions using the values of the eye tracking parameters,
determining a gaze depth of the user using the computed values and a model that maps values of the eye tracking functions to various gaze depths, and
performing an action based on the determined gaze depth.

20. The non-transitory computer readable medium of claim 19 wherein the eye tracking parameters describe a first horizontal axis across for a left eye of the user, a second horizontal axis for a right eye of the user, a first distance along the first horizontal axis to a first reference location on the first horizontal axis closest to a determined pupil location for the left eye, and a second distance along the second horizontal axis to a second reference location on the second horizontal axis closest to a determined pupil location for the right eye.

* * * * *